E. P. LINDAHL.
BOTTLE CARRIER.
APPLICATION FILED APR. 7, 1910.

1,017,432.

Patented Feb. 13, 1912.

2 SHEETS—SHEET 1.

WITNESSES

INVENTOR
ERICK P. LINDAHL
BY Paul & Paul
ATTORNEYS

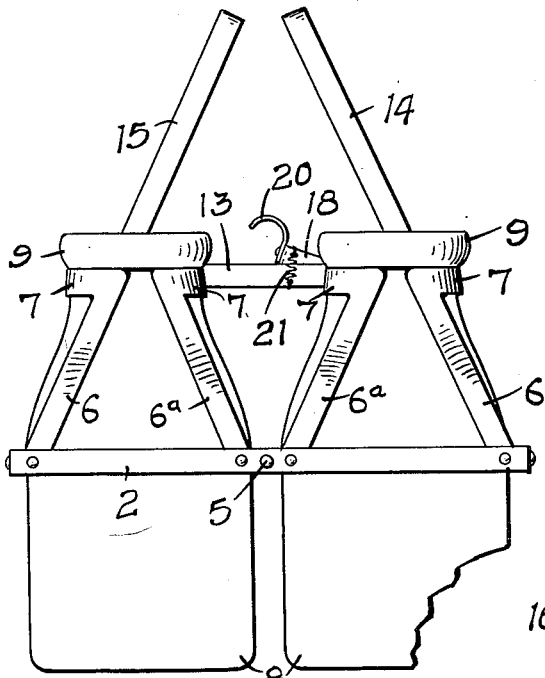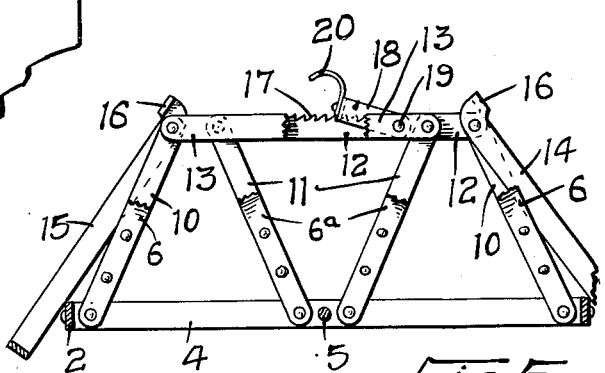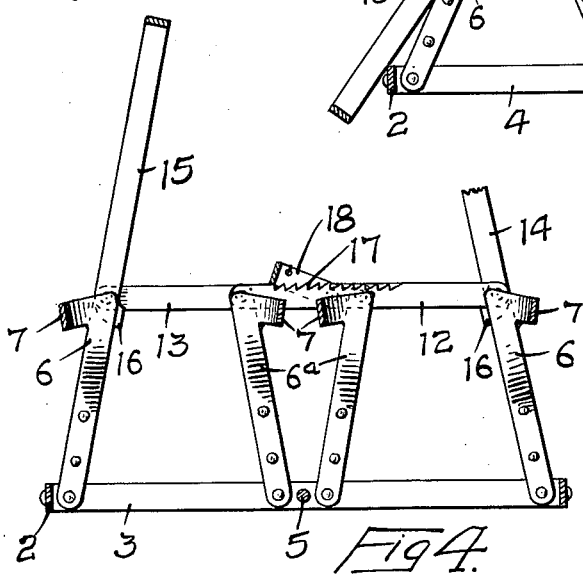

UNITED STATES PATENT OFFICE.

ERICK P. LINDAHL, OF MINNEAPOLIS, MINNESOTA, ASSIGNOR, BY DIRECT AND MESNE ASSIGNMENTS, TO SANITARY BOTTLING DEVICE COMPANY, OF MINNEAPOLIS, MINNESOTA, A CORPORATION OF MINNESOTA.

BOTTLE-CARRIER.

1,017,432.  Specification of Letters Patent.  Patented Feb. 13, 1912.

Application filed April 7, 1910. Serial No. 554,059.

*To all whom it may concern:*

Be it known that I, ERICK P. LINDAHL, of Minneapolis, Hennepin county, Minnesota, have invented certain new and useful Improvements in Bottle-Carriers, of which the following is a specification.

My invention relates to devices designed for carrying bottles, jars or the like and the object of the invention is to provide means by which a series of bottles, such as those adapted for containing milk, may be easily transported from place to place without danger of spilling or breakage.

The invention consists generally in a frame and a series of jaws mounted thereon and adapted to clasp the neck of the bottle.

Figure 1:
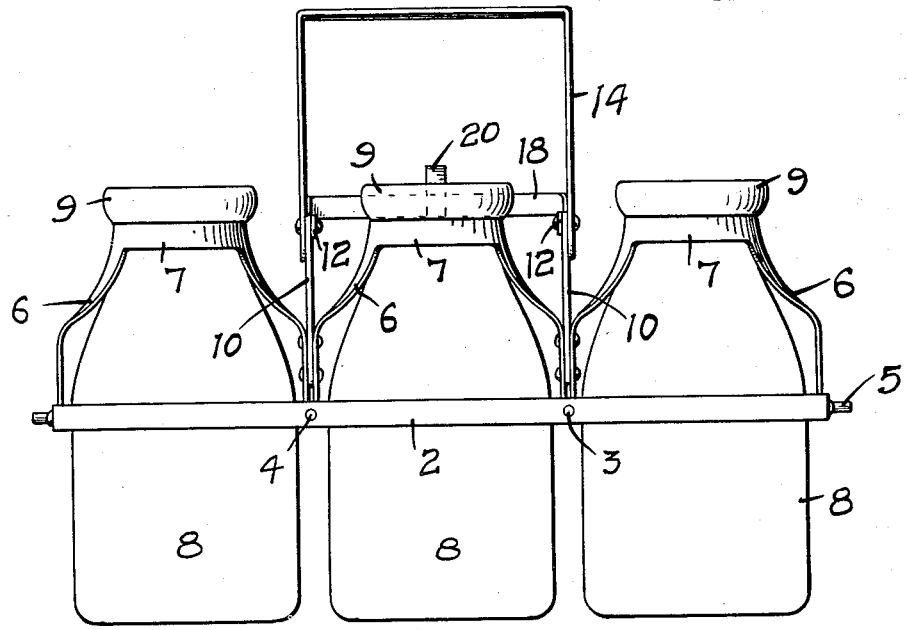
Figure 2:
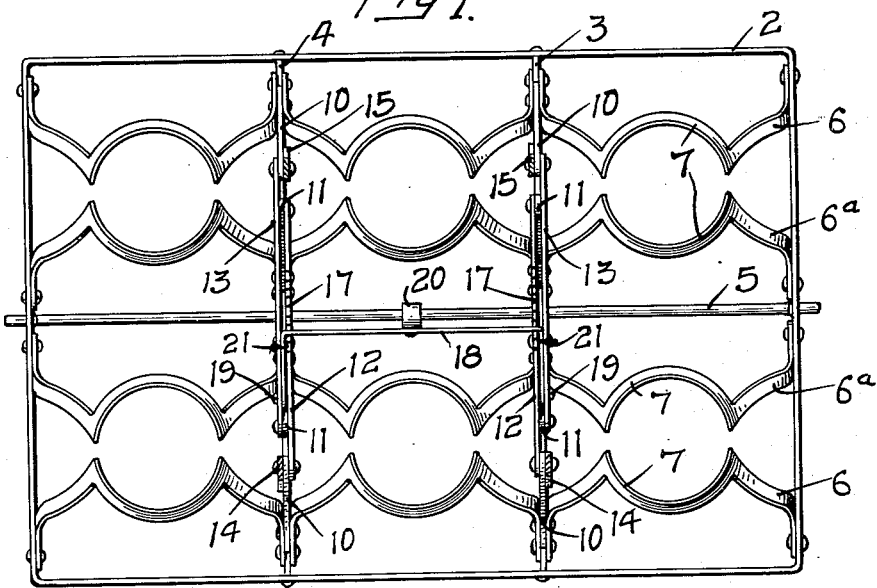

In the accompanying drawings forming part of this specification, Figure 1 is a side view of a bottle carrier embodying my invention, Fig. 2 is a top view, partially in section, of the same, Fig. 3 is an end view, Fig. 4 is a detail view showing the manner of mounting the jaws and illustrating the locking device for holding the jaws in their clamping position, Fig. 5 is a similar view, showing the carrying handles swung down to an inoperative, out-of-the-way position.

In the drawing, 2 represents a frame, preferably rectangular in form, of suitable size according to the desired capacity and provided with cross bars 3 and 4.

5 is a shaft extending lengthwise of the frame and connecting the middle portion of its ends.

6 represents the outer jaws and 6ª the inner jaws, and there may be any number of these jaws according to the desired carrying capacity of the device. I have here shown three pairs of jaws on each side of the center line of the carrier to adapt the device for carrying six bottles of cream or milk or any other article to be transported in the carrier. Each jaw has a curved gripping face 7, the opposite jaws on the same side of the carrier forming a substantially circular clamp between which the neck of the bottle is gripped. I have shown a milk or cream bottle 8 in the carrier and this is generally provided with an enlarged shoulder 9 at its upper end, the jaws being adapted to grip the neck of the bottle below this shoulder and hold the same securely. The jaws are pivoted on the ends of the frame and on outer bars 10 and inner bars 11, which are pivotally attached at their lower ends to the cross bars 3 and 4. The upper ends of the bars 10 are pivotally connected by transverse links 12 and 13 with the corresponding ends of the bars 11 on the other side of the center of the frame. That is, each bar 10 is connected with the bar 11 on the opposite side of the carrier so that one of the middle bars will move in unison with one of the side bars and the jaws carried by these bars will, in consequence, move in the same direction and when all the bars are operated together it follows that the jaws on the same side of the center of the frame will move toward one another and clamp the neck of the bottle between them.

For the purpose of opening and closing the jaws I provide handles 14 and 15 pivotally mounted on the outside bars 10 and adapted to be folded outwardly to the position indicated in Fig. 5, so that the bottles can be placed in the rack and filled without interference of the carrying handles. The lower ends of the carrying handles are preferably provided with lugs 16 which engage the edges of the bars 10 and limit the inward swinging movement of the handles. I also prefer to provide means for locking the jaws in their closed position so that the person holding the carrier can release the grasp on the handles without danger of the jaws separating prematurely and releasing the bottles. This locking device consists preferably in providing a series of ratchet teeth 17 in the upper edges of one pair of the bars, such as 13, and providing a locking bail 18 that is pivoted at 19 on the other bars and has an edge that is adapted to engage the teeth of the ratchet and positively lock the jaws in their clamping position and prevent them from separating, but permitting them to move to increase the clamping pressure on the necks of the bottles. The bail 18 is preferably provided with a finger grip 20 by means of which it can be lifted and disengaged from the ratchet teeth against the tension of a spring 21.

The jaws are preferably composed of sheet metal having their clamping faces curved to fit the necks of the bottles and the carrying handles are so arranged that they can be easily grasped with one hand to draw the jaws to their locking position and whenever desired, the person carrying the device can, without releasing the handles, trip the locking bail with one finger and permit separation of the jaws. The locking bail will be found of particular advantage to hold the jaws in place while the bottles are being filled and when the handles are swung down to an inoperative position for any other purpose.

In various ways the details of construction herein may be modified without departing from the spirit of my invention.

I claim as my invention:—

1. A carrier comprising a frame, relatively movable inner and outer jaws mounted in said frame, and links pivotally connecting said movable jaws with one another.

2. A bottle carrier comprising a frame, outer jaws pivotally supported at the sides of said frame, inner jaws pivotally supported near the middle of said frame, means connecting the outer jaws on each side with the inner jaws on the opposite side of the frame, whereby when the outer jaws move toward one another, the inner jaws will move in opposite directions to coöperate with the outer jaws, and operating handles connected with said jaws.

3. A bottle carrier comprising a frame, jaws pivotally supported thereon and having curved clamping faces, some of said jaws being arranged near the outer edges of said frame and others of said jaws near the middle portion thereof and on both sides of the center, the outer jaws on each side being operatively connected with the inner jaws on the opposite side of the center, whereby when said outer jaws are swung toward each other said inner jaws will be separated, and carrying handles connected with said jaws and adapted, when moved toward one another, to swing said jaws to their clamping position.

4. A carrier comprising a frame, relatively movable outer and inner jaws mounted in said frame, links pivotally connecting said movable jaws with one another, suitable carrying handles, and a locking means for said jaws.

5. A bottle carrier comprising a frame, outer and inner jaws pivotally mounted thereon, means connecting the outer and inner jaws on opposite sides of the center of said frame with one another, whereby when said outer jaws are swung toward one another, said inner jaws will be separated and will move toward said outer jaws to clamp a bottle neck between them, carrying handles connected with said outer jaws and adapted to swing toward one another to a carrying position, and means for locking said jaws in their clamping position, for the purpose specified.

6. A carrier comprising a frame, relatively movable outer and inner jaws mounted therein, means coöperating with said jaws to grip a bottle or jar, pivoted means connecting said movable jaws with one another, suitable carrying handles, and a pivoted locking bail for holding said jaws against premature separation.

7. A carrier comprising a frame, relatively movable outer and inner jaws mounted therein, links pivotally connecting said movable jaws with one another, suitable carrying handles, and a locking bail for holding said jaws against premature separation.

In witness whereof, I have hereunto set my hand this 26th day of March 1910.

ERICK P. LINDAHL.

Witnesses:
L. C. CRONEN,
RICHARD PAUL.